(No Model.)
S. F. HEATH & H. A. THAYER.
CAR COUPLING.
No. 395,391. Patented Jan. 1, 1889.
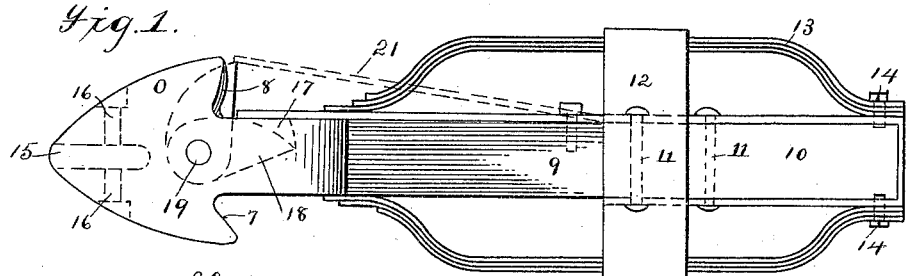
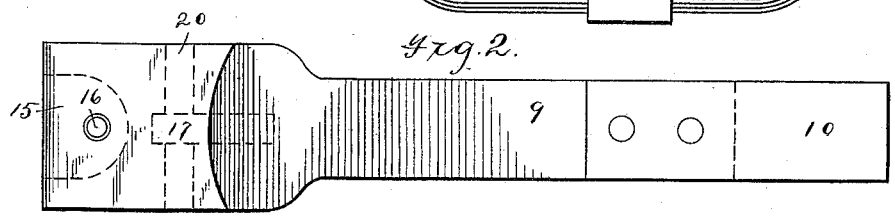
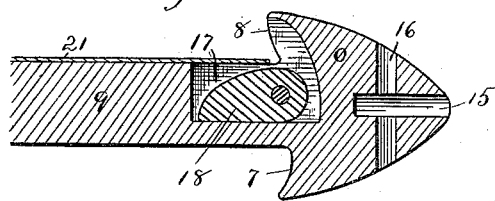
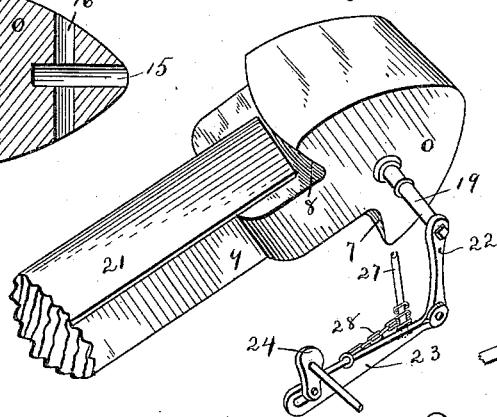
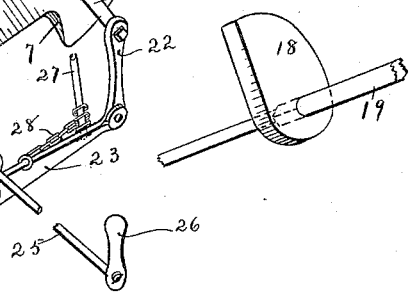
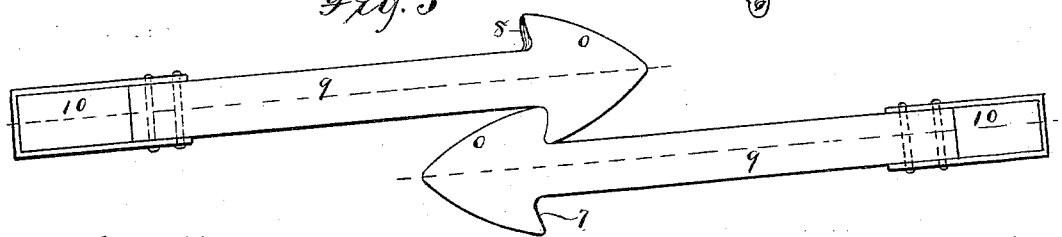
Attest
W. E. Bowen
L. Hopper
Inventor
Starling F. Heath,
Hayden A. Thayer,
By J. E. M. Bowen
Attorney.

UNITED STATES PATENT OFFICE.

STARLING F. HEATH AND HAYDEN A. THAYER, OF FITCHBURG, MASSACHUSETTS.

CAR-COUPLING.

SPECIFICATION forming part of Letters Patent No. 395,391, dated January 1, 1889.

Application filed December 15, 1887. Serial No. 257,967. (No model.)

*To all whom it may concern:*

Be it known that we, STARLING F. HEATH and HAYDEN A. THAYER, citizens of the United States, and residents of Fitchburg, in the county of Worcester and State of Massachusetts, have invented certain new and useful Improvements in Car-Couplings, of which the following is a specification.

This invention relates to apparatus for coupling cars, and especially freight-cars, though adapted for use on passenger-cars also.

The object of the invention is to devise a car-coupling whereby cars of different heights may be coupled together, and whereby a car provided with a link-and-pin coupling may be coupled to a car provided with the coupling herein described.

A further object is to devise a coupling wherewith freight and other cars may be uncoupled without going in between the cars, our arrangement enabling the operation to be performed from the roof of the car or from the side of the car near the ground.

Our invention accordingly consists in the construction and arrangement hereinafter described, and illustrated in the accompanying drawings, the features of novelty for which protection is desired being specified in the claims at the end of this description.

In the accompanying drawings, which form a part of this description, and in which like figures of reference indicate like parts in the several views, Figure 1 represents a side elevation of a coupling embodying our improvements. Fig. 2 is a bottom plan view of said coupling. Fig. 3 is a detached view of the cam and shaft whereby the couplings are disconnected. Fig. 4 is a detail in perspective showing the means for operating the couplings. Fig. 5 is a side elevation of a pair of couplings in operative connection, and Fig. 6 is a central longitudinal sectional view through one of the coupling-heads.

Referring to the drawings, O indicates the coupling-head, which is somewhat in the form of an arrow-head, the top and bottom surfaces increasing in thickness from the front to the rear, as shown. On the jaws of the coupling-head, one of the bearing-surfaces, as at 7, is preferably made concave, while the other, as at 8, is convex, this construction providing a uniform bearing-surface while the cars are passing around curves. The coupling-heads are all made alike, so that they are readily interchangeable, as will be apparent from an inspection of the drawings.

The extension 9 at the back of the head of the coupling is adapted to be secured to the draw-bar 10 by means of bolts 11, or by other suitable means, the draw-bar 10 being fastened to the car in the usual way. 12 indicates a grip, which is fastened in a stationary manner to the car and serves as a support or bearing for the springs 13, which pass therethrough and are connected at their rear ends by bolts 14 or otherwise to the draw-bar 10. The coupling-extension 9 rests upon and is supported by the forward end of springs 13, as shown.

In the head O of the coupling there is formed a slot, 15, which is adapted to receive the link of the usual link-and-pin coupling when it is desired to couple a car provided with that style of coupling with a car provided with our improved coupling, and 16 indicates the hole extending vertically through that portion of the coupling-head in which slot 15 is located to receive the pin whereby the link is held in the slot.

In the rear of slot 15 in the coupling-head there is provided a socket, 17, to receive a cam, 18, which is fast upon a shaft, 19, which has its bearing in the diametrical bore 20. The shaft 19 protrudes beyond one side of the coupling-head, as shown in Fig. 4, and receives the means for uncoupling, as hereinafter explained.

Secured by bolt or otherwise to the top surface of extension 9 of the coupling there is a flat spring, 21, which co-operates with cam 18 to disconnect the coupling-jaws when shaft 19, to which cam 18 is fixedly attached, is operated by the means shown for that purpose. When the coupling-heads are operatively connected, the under jaw of the uppermost coupling-head rests upon spring 21, and said spring at its front end overlaps the cam 18, so that when the cam is revolved, in the act of uncoupling, the spring 21 is thrown up slightly above the upper surface of the upper jaw of the lower coupling-head, thus insuring the complete separation of the two couplings.

The means which we prefer to employ for separating the couplings when it is desired to uncouple two cars provided with couplings embodying our improvement are shown in Fig. 4, in which view 22 is a piece of flat iron connected at one end with shaft 19 and extending downward and having its other end connected to bar 23, which extends a short distance under the car in the direction of its length. Near the outer end of bar 23 there is secured a lug, 24, to the upper end of which a bar, 25, is attached, which bar projects laterally outside of the car-body and is provided upon its end with a crank or handle, 26, for operating the same when it is desired to give motion to shaft 19 to throw up cam 18 to uncouple the cars.

To release the couplings from the roof of the car, which is often desirable, especially on freight-cars, the rod 27 is employed in connection with the operating means 22 and 23, above described, the said rod 27 being suitably secured to or near the sill or platform of the car and extending to the roof, where it is provided with a crank or handle, as usual. Secured to the lower end of rod 27 is a chain, 28, which is also connected to a lug on bar 23, and by which, as it is wound upon rod 27 when said rod is revolved, the outer end of said bar 23 will be sufficiently elevated to give the requisite motion to shaft 19 for changing the position of cam 18 in its socket.

Having thus described our invention, what we claim as new, and desire to secure by Letters Patent, is—

1. A car-coupling head provided with two attaching-jaws and with a socket in the rear of one of said jaws, in combination with a cam located in said socket on a shaft extending transversely through the coupling-head, and a flat spring secured to the extension of the coupling-head and co-operating with the cam, substantially as set forth.

2. A pair of car-coupling heads, each provided with two attaching-jaws and with a socket in the rear of one of said jaws, in combination with cams located in said sockets on shafts extending transversely through the coupling-heads, a flat spring secured to the extension of each coupling-head, and appliances connected to said transverse shafts for actuating the same from the side or roof of the car, substantially as set forth.

3. The combination, with a pair of coupling-heads, each provided with two attaching-jaws and with a socket in the rear of one of said jaws, in combination with releasing-cams located in said sockets on shafts extending transversely through the coupling-heads, and appliances for operating said shafts, consisting of bar 22, rod 23, and rod and chain 27 and 28, substantially as set forth.

Signed at Fitchburg, in the county of Worcester and State of Massachusetts, this 18th day of November, A. D. 1887.

STARLING F. HEATH.
HAYDEN A. THAYER.

Witnesses:
JOHN GREEN,
JAMES PITTS.